United States Patent Office 3,072,572
Patented Jan. 8, 1963

3,072,572
SALTS OF HYDROXY-PHENYL ESTERS
OF AMIDIC ACIDS
Troy L. Cantrell, Drexel Hill, Pa., John G. Peters, Audubon, N.J., and Herschel G. Smith, Wallingford, Pa., assignors to Gulf Oil Corporation, Pittsburgh, Pa., a corporation of Pennsylvania
No Drawing. Filed Nov. 7, 1958, Ser. No. 772,407
10 Claims. (Cl. 252—42.7)

This invention relates to new chemical compounds and to mineral oil compositions containing the same, and more particularly, it relates to new chemical compounds which impart rust and corrosion inhibiting properties to various mineral oil compositions.

In general, the compounds of this invention may be defined by the following generic formula:

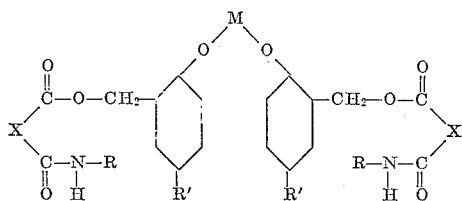

wherein

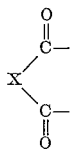

represents the acyl residue of a dicarboxylic acid capable of forming a cyclic acid anhydride, R is an alkyl radical of from 8 to 26 carbon atoms, R' is an alkyl radical containing 4 to 12 carbon atoms and M represents an alkaline earth metal, such as calcium, barium, strontium or magnesium.

The compounds of our invention are prepared by condensing a mono-alkyl amide of a dicarboxylic acid anhydride, an alkaline earth metal salt of a phenol having a para-alkyl substituent of from 4 to 12 carbon atoms and formaldehyde in a molar ratio of 2:1:2.

Amidic acids, which are suitable for the purposes of this invention, are derived from the partial amidation of a cyclic dicarboxylic acid anhydride with a primary alkyl amine containing from 8 to 26 carbon atoms. This amidation reaction is well known to the art. Briefly, the reaction is conducted with substantially equimolar proportions of the acid ahydride and amine at moderate temperatures. Since the reaction is exothermic, no external source of heat is necessary.

Any cyclic dicarboxylic acid anhydride can be used, since these substances, as known in the art, are capable of reacting with primary amines to form amides. Aliphatic dicarboxylic acids which are capable of forming cyclic acid anhydrides are those having two carboxyl groups attached to adjacent carbon atoms or to carbon atoms separated by a third carbon atom. Examples of such acids are maleic, succinic and glutaric acids. Aromatic dicarboxylic acid anhydrides, such as the anhydride of o-phthalic acid, are also suitable for the purposes of this invention.

As noted hereinabove, primary alkyl amines which contain from 8 to 26 carbon atoms are used to form the amide reactant of our invention. Some of the amines of this generic class are mono-capryl amine, mono-lauryl amine, mono-myristyl amine, mono-palmityl amine, and mono-stearyl amine. Any of these amines or mixtures thereof may be used with mixtures being preferred. An example of a commercially available mixed amine is the so-called "cocoamine" prepared by converting the mixed acids of coconut oil into the corresponding amines by well known methods. The commercial "cocoamine" has an average molecular weight of about 200 to 210 and contains a mixture of normal primary amines with an even number of carbon atoms. The mixture covers the range from n-primary octylamine to n-primary octadecylamine with n-primary dodecylamine predominating.

The alkaline earth metal phenates used in making our new chemical compounds are conveniently prepared by neutralizing a para-alkylated phenol with the oxide or hydroxide of any of the alkaline earth metals, such as calcium, barium, magnesium and strontium. It is desirable to conduct the neutralization reaction in the presence of an inert solvent, such as benzene, toluene, hexane, or a light mineral lubricating oil. The reaction takes place at moderate temperatures, but in order to remove both the water added and that formed in the reaction, the temperature should be taken above the boiling point of water, i.e. 212° F.

The phenols used in preparing the alkaline earth metal phenates are para-alkyl substituted phenols having from 4 to 12 carbon atoms in the alkyl substituent. Thus, the alkyl substituent may include normal or branched chain butyl, amyl, hexyl, heptyl, octyl, nonyl, decyl and dodecyl radicals. The para-alkyl phenols are preferably obtained by reacting phenol with an appropriate olefin in the presence of concentrated sulfuric acid. It is preferred to conduct the alkylation with di-isobutylene since the resulting product is primarily a para-tetramethylbutyl phenol.

In performing the condensation reaction of the amidic acid, with the alkaline earth metal phenate and formaldehyde, two mols of the amidic acid are first mixed with one mol of the alkaline earth metal phenate, and the temperature is raised to about 170° F. Two mols of formaldehyde are then slowly added to the reaction mixture. Following the addition of formaldehyde the temperature is raised slightly to about 180° F. and held there for approximately two hours to complete the reaction. The resulting product is dehydrated by raising the temperature to about 300° F. Higher temperatures may be employed for drying, but temperatures in excess of 400° F. should not be used as decomposition of the product may result.

Examples I and II following are representative of the mode of preparation of the compounds of this invention. It is understood that the examples are by way of illustration only and are not intended as limiting.

*Example I*

In this example, the compound was prepared from the following materials, using the proportions by weight specified below.

| Material: | Weight, grams |
|---|---|
| Phthalic anhydride | 296 |
| Cocoamine | 420 |
| Tetramethylbutyl phenol | 412 |
| Lime | 74 |
| Formaldehyde | 70 |
| Mineral oil | 1194 |

The phthalic anhydride and cocoamine were first introduced into a reaction vessel. There followed a spontaneous, exothermic reaction wherein the temperature rose to 240° F. momentarily, after which it slowly receded following completion of the reaction.

Into a separate reaction vessel there was introduced the tetramethylbutyl phenol together with a 450 gram portion of the mineral oil. The temperature was raised to 170° F. and the mixture was agitated until all of the phenol was dissolved in the mineral oil. The lime was then added to this mixture in an aqueous slurry while maintaining the temperature at 170° F. and continuing agitation. After completion of this neutralization reaction, the temperature was raised to 300° F. in order to remove the added and formed water. The resulting product was cooled to about 170° F., after which the previously prepared cocoamine-phthalic anhydride reaction product was added to the mixture with agitation. Formaldehyde (in 37 percent by weight aqueous solution) was then added slowly. Following the addition of formaldehyde, the temperature was raised to 180° F. and maintained for approximately two hours. Water was then removed from the reaction mass by raising the temperature to 300° F. The resulting product was then diluted with the balance of the mineral oil (744 grams) and filtered. An analysis of the mineral oil solution of the product formed by this process gave the following results:

Neutralization value total acid No._____ 5.95
Nitrogen, percent by wt_____ 1.18
Sulfated residue, percent by wt_____ 2.23
Calcium, percent by wt_____ 0.64

*Example II*

In this example, the compound was prepared from the following materials, using the proportions by weight specified below:

| | Weight, grams |
|---|---|
| Maleic anhydride | 196 |
| Cocoamine | 420 |
| Tetramethylbutyl phenol | 412 |
| Lime | 74 |
| Formaldehyde | 70 |
| Mineral oil | 1090 |

The maleic anhydride was first introduced into a reaction vessel and heated until it assumed the liquid state. The temperature was adjusted to about 170° F. after which the cocoamine was added. Following completion of the reaction, the product was allowed to cool.

Into a separate reaction vessel there was introduced the tetramethylbutyl phenol together with the mineral oil. The temperature was raised to 170° F. and the mixture was agitated until all of the phenol was dissolved in the mineral oil. The lime was then added to this mixture in an aqueous slurry while maintaining the temperature at 170° F. and continuing agitation. After completion of this neutralization reaction, the temperature was raised to 300° F. in order to remove both the added and formed water. The resulting product was cooled to about 170° F. after which the previously prepared cocoamine-maleic anhydride reaction product was added to the mixture with agitation. The formaldehyde (in 37 percent by weight aqueous solution) was then added. Following the addition of formaldehyde, the temperature was raised to 180° F. and maintained for approximately two hours. Water was then removed from the reaction mass by raising the temperature to 300° F. An analysis of the mineral oil solution of the product formed gave the following results:

Neutralization value total acid No._____ 15.74
Nitrogen, percent by wt_____ 1.23
Sulfated residue, percent by wt_____ 4.88
Calcium, percent by wt_____ 1.43

As will be readily apparent to one skilled in the art, any of the previously described class of acid anhydrides, primary alkyl amines, alkylated phenols and alkaline earth metal oxides or hydroxides can be substituted in the above examples with satisfactory results.

The compounds of this invention are useful as improvement agents for mineral oil compositions in that they impart corrosion and rust inhibiting properties to such compositions. Normally, from about 0.01 to about 2.0 percent of the additive by weight of the composition is sufficient for this purpose, although greater proportions may be employed, if desired. Examples of various mineral oils which are benefited by the compounds of this invention are motor oils, gasoline, kerosene, diesel fuel, furnace oil, lubricating greases and turbine oils.

In order to determine the effectiveness of the novel mineral oil compositions included in this invention for inhibiting rust and corrosion, tests were conducted in accordance with the provisions of ASTM Corrosion Test D665–54, Procedures A and B.

This test is that which is specified in the ASTM Standards of Petroleum Products and Lubricants. In brief, Procedure A involves placing a 300 ml. sample of the oil to be tested in a 400 ml. beaker which is, in turn, immersed in a constant temperature bath maintained at a temperature of 140° F. The beaker is fitted with a cover provided with openings for a stainless steel, motor-driven stirrer and insertion of a standard, cylindrical steel test specimen having a diameter of 0.50 inch and a length of 2.6 inches, and which has been carefully cleaned and polished according to a prescribed procedure just prior to the test. The stirrer is started and when the oil sample in the beaker reaches a temperature of 140° F., the test specimen is lowered through the proper opening and is suspended from the beaker cover. After thirty minutes, 30 ml. of the oil are removed and replaced with 30 ml. of distilled water. Stirring is then continued for 24 hours with the temperature maintained at 140° F. At the end of this period, the steel test specimen is removed and examined for rust spots. A test oil is reported as passing if the test specimen is rust-free at the end of the test period. Test Procedure B is conducted in the same manner as Test Procedure A with the exception that synthetic sea water is substituted for distilled water, thus providing a more rigorous test.

The effectiveness of our new compounds as mineral oil additives is clearly illustrated by the test results of the following examples.

*Example III*

A lubricating oil was treated with 1.0 percent by weight of the compound prepared according to Example I above. Comparison test results of the untreated and the treated oil were as follows:

| | Untreated Oil | Treated Oil |
|---|---|---|
| Gravity, ° API | 31.5 | 30.5 |
| Viscosity, SUV: | | |
| 100° F | 149.1 | 147.1 |
| 210° F | 43.7 | 43.5 |
| Viscosity Index | 111 | 109 |
| Flash, OC, ° F | 425 | 420 |
| Fire, OC, ° F | 500 | 500 |
| Pour, ° F | +5 | +5 |
| Color, ASTM Union | 1.0 | 2.25 |
| Carbon Residue, Conradson, Percent | 0.01 | 0.15 |
| Rust-Preventive Test, ASTM D665–54: | | |
| Procedure A, 24 Hr | (1) | (2) |
| Procedure B, 24 Hr | (1) | (2) |
| Ash, Percent | nil | 0.058 |

¹ Severe rust (100%).
² Passes.

*Example IV*

An improved lubricating oil was prepared by treating a lubricating oil base with 1.0 percent by weight of the compound prepared according to Example II above. The properties of the unimproved and improved lubricating oils were as follows:

|  | Untreated Oil | Treated Oil |
|---|---|---|
| Gravity, °API | 31.5 | 30.5 |
| Viscosity, SUV: |  |  |
| 100° F | 149.1 | 149.1 |
| 210° F | 43.7 | 43.7 |
| Viscosity Index | 111 | 111 |
| Flash, OC, °F | 425 | 435 |
| Fire, OC, °F | 500 | 495 |
| Pour, °F | +5 | +10 |
| Color, ASTM Union | 1.0 | 1.75 |
| Carbon Residue, Conradson, Percent | 0.01 | 0.15 |
| Rust-Preventive Test, ASTM D665-54: |  |  |
| Procedure A, 24 Hr | (1) | (2) |
| Procedure B, 24 Hr | (1) | (2) |
| Ash, Percent | nil | 0.078 |

[1] Severe rust (100%).
[2] Passes.

Examples III and IV above clearly show the beneficial results obtained in rust and corrosion inhibition when our novel compounds are incorporated into mineral lubricating oil compositions. Similar improvements are obtainable by the use of the compounds of this invention in other mineral oil compositions such as gasoline, kerosene, diesel fuel, furnace oil, lubricating greases, etc.

It is to be understood that the improved mineral oil compositions of this invention can be additionally improved by incorporation therein of other known additives in order to confer other desirable properties such as increased resistance to oxidation, increased stability, etc. Thus, there can be added viscosity index improvers, thickeners, bearing corrosion inhibitors, anti-oxidants, etc.

It is not intended that this invention be limited to any of the specific examples which were given merely for the sake of illustration but only by the appended claims in which it is intended to claim all novelty inherent in the invention as broadly as the prior art permits.

What we claim is:

1. A compound having the formula:

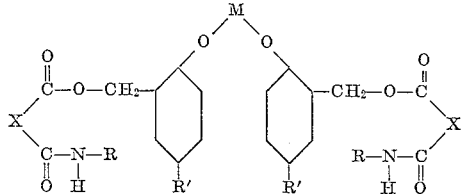

wherein X is selected from the group consisting of vinylene, ethylene, trimethylene and o-phenylene; R is alkyl of from 8–26 carbon atoms; R' is alkyl of from 4–12 carbon atoms; and M is an alkaline earth metal.

2. A compound having the formula:

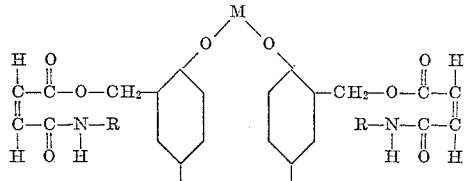

wherein R is alkyl of from 8–26 carbon atoms, R' is alkyl of from 4–12 carbon atoms, and M is an alkaline earth metal.

3. A compound having the formula:

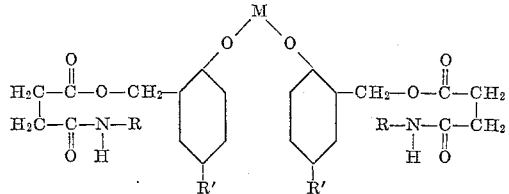

wherein R is alkyl of from 8–26 carbon atoms, R' is alkyl of from 4–12 carbon atoms, and M is an alkaline earth metal.

4. A compound having the formula:

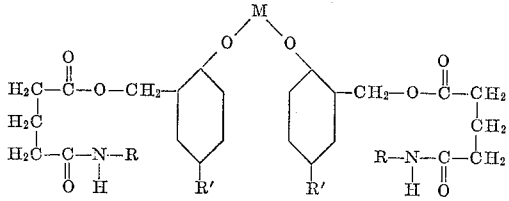

wherein R is alkyl of from 8–26 carbon atoms, R' is alkyl of from 4–12 carbon atoms, and M is an alkaline earth metal.

5. A compound having the formula:

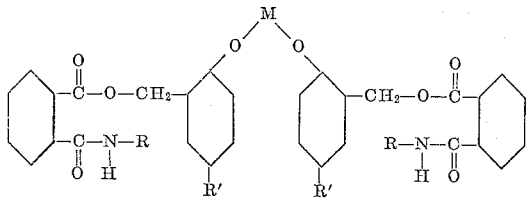

wherein R is alkyl of from 8–26 carbon atoms, R' is alkyl of from 4–12 carbon atoms, and M is an alkaline earth metal.

6. A compound having the formula:

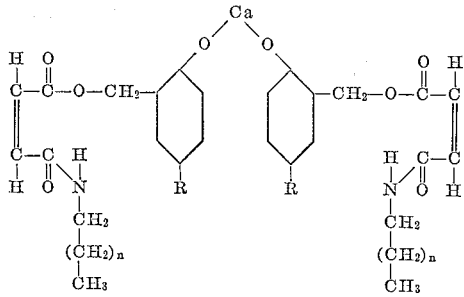

wherein R is tetramethylbutyl and $n$ is a number between 6 and 24.

7. A compound having the formula:

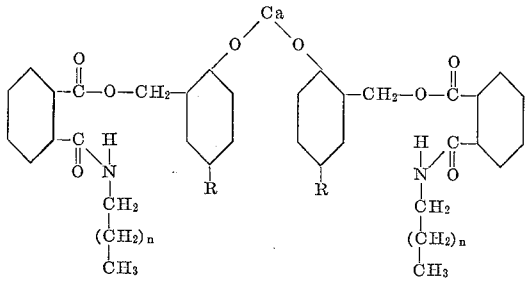

wherein R is tetramethylbutyl and $n$ is a number between 6 and 24.

8. A mineral oil composition comprising a major amount of mineral oil and from 0.01 to 2.0 percent by weight of a compound having the formula:

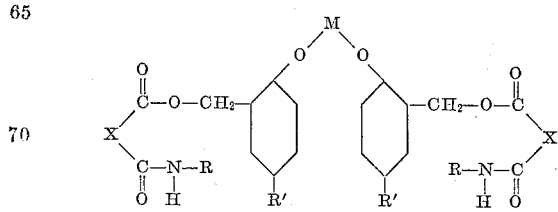

wherein X is selected from the group consisting of vinylene, ethylene, trimethylene and o-phenylene; R is alkyl of from 8–26 carbon atoms; R' is alkyl of from 4–12 carbon atoms; and M is an alkaline earth metal.

9. A lubricant composition comprising a major amount of a mineral lubricating oil and from 0.01 to 2.0 percent by weight of a compound having the formula:

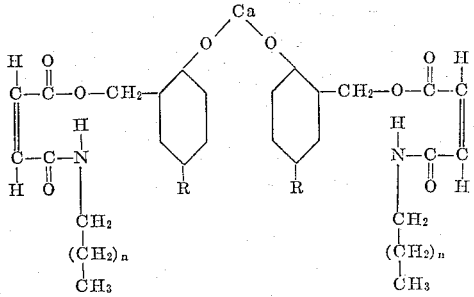

wherein R is tetramethylbutyl and $n$ is a number between 6 and 24.

10. A lubricant composition comprising a major amount of a mineral lubricating oil and from 0.01 to 2.0 percent by weight of a compound having the formula:

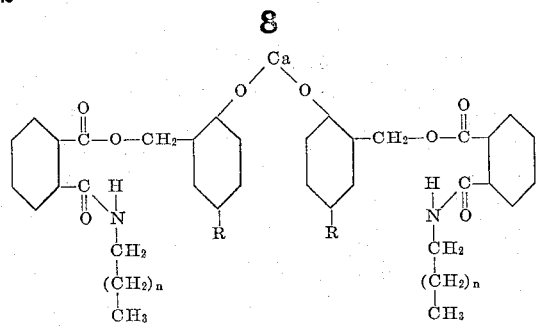

wherein R is tetramethylbutyl and $n$ is a number between 6 and 24.

References Cited in the file of this patent
UNITED STATES PATENTS

| | | |
|---|---|---|
| 1,803,298 | Bannister | Apr. 28, 1931 |
| 2,306,095 | Valjavec | Dec. 22, 1942 |
| 2,402,448 | Richards | June 18, 1946 |
| 2,674,577 | McCoy et al. | Apr. 6, 1954 |
| 2,798,087 | Hotten | July 2, 1957 |
| 2,820,053 | Hotten | Jan. 14, 1958 |